Feb. 5, 1935. P. H. CHASE 1,989,914
CABLE
Filed Oct. 20, 1928   2 Sheets-Sheet 2

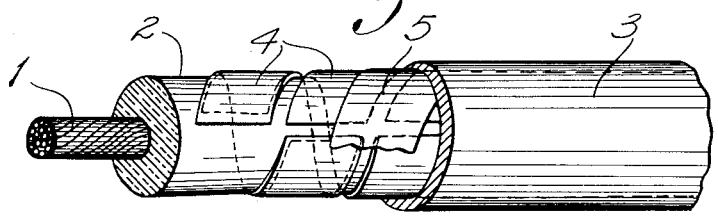
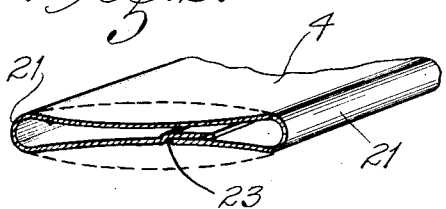 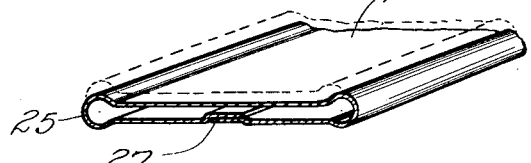
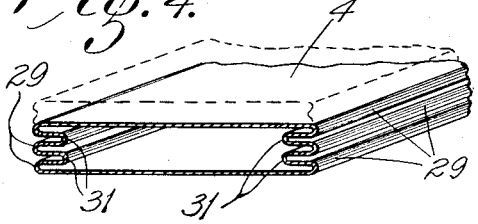 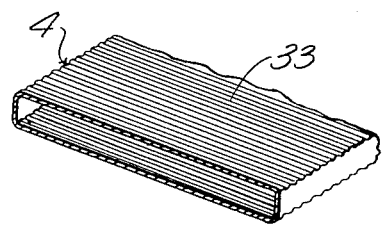
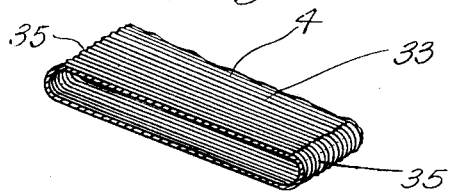 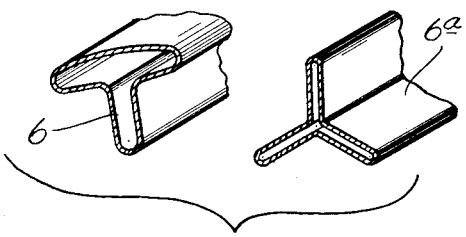
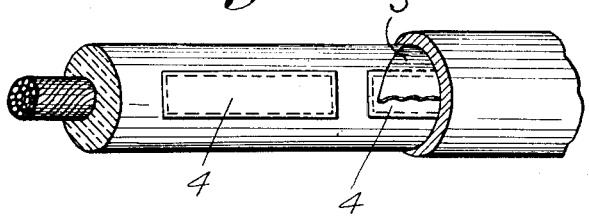

Philip H. Chase,
Inventor,
Delor G. Haynes,
Attorney.

Patented Feb. 5, 1935

1,989,914

UNITED STATES PATENT OFFICE 1,989,914

CABLE

Philip H. Chase, Bala-Cynwyd, Pa.

Application October 20, 1928, Serial No. 313,763

12 Claims. (Cl. 173—266)

This invention relates to cables, and with regard to certain more specific features to an impregnated electric cable, preferably for high voltages.

Among the several objects of the invention may be noted the provision of a simple and improved method of constructing a cable to relieve or equalize hydrostatic pressures within the sheath; the provision of improved separated gas filled expansion devices or units within the cable for controlling the internal pressure due to temperature and other changes; the provision of a cable construction of the class described which minimizes the formation of voids therein; and the provision within a cable of the class described for compensating the pressures caused by the relative expansion and contraction of the parts of the cable. Other objects will be in part obvious and in part pointed out hereinafter.

The invention accordingly comprises the elements and combinations of elements, features of construction and operation, arrangement of parts, steps and sequence of steps, which are exemplified in the structure hereinafter described and the scope or application of which is indicated in the following claims.

In the accompanying drawings in which are illustrated several embodiments of the invention, Fig. 1 is a trimetric view of a section of cable, certain portions being broken away to show a helical form of the invention;

Figs. 2, 3 and 4 are trimetric views showing sections of various forms of flexible containers;

Figs. 5 and 6 are trimetric views showing sections of flexible containers having laterally corrugated surfaces;

Fig. 7 is a trimetric view of a section of cable, showing a modified non-helical form of the invention, parts being broken away;

Fig. 8 is a trimetric view, partly in section showing a modified triangular form of the invention;

Similar reference characters indicate corresponding parts throughout the several views of the drawings.

Figure 14:
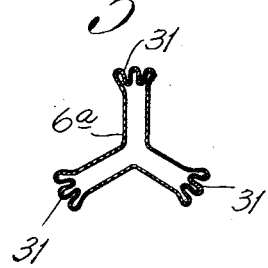
Figure 15:
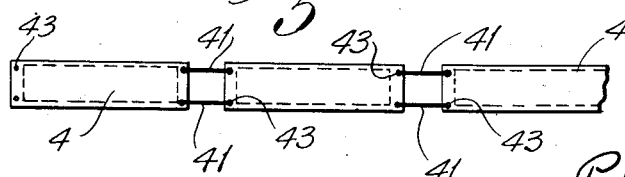
Fig. 15 is a view showing a number of the containers of Figs. 1 and 7 linked together; and, Fig. 16 is a cross section showing an alternative type position.

It is to be understood that Figs. 2, 3, 4, 5, 6, 8, 11, 12, 13 and 14 show opened ends of certain tape sections for purposes of illustrating the cross sectional contour and actually each of these tape sections forms a relatively short unit, closed at the ends and at all sides, as illustrated in Figs. 1, 7 and 15.

Referring now more particularly to Fig. 1, a cable conductor is designated by numeral 1 and the insulation by numeral 2. Applied helically over the insulation is a series of separate, self contained, hollow tapes or containers or units 4, closed on the sides and at the ends, which are each so constructed of thin, flexible metal, for example copper, that the cross-sectional area, and therefore the volume, is capable of sufficient change, as a consequence of lateral movement of the walls of the tape. Over these hollow containers 4 is applied a retaining or protecting tape 5, which may be made of paper or metal or of other suitable material. This protecting tape 5 is laid on helically in the same or reverse helical direction with regard to the hollow tapes 4. An outer lead sheath 3 completes the structure.

Figs. 2, 3 and 4 show sectionally and in trimetric projection several modifications of the hollow tapes, pads or flattened tubes 4, in which each of said tapes 4 is constructed of one or two strips of thin metal tightly joined together at the edges and ends, for example, by welding or soldering, or by a combination of these methods, to afford a fluid-tight union. The solid lines show unexpanded or compressed positions of the walls and the dotted lines show positions of the walls when laterally expanded due to a difference in internal and external pressures. It is to be understood that compressed positions of the walls may be concave as illustrated in Fig. 2 resulting in greater capacity for volumetric expansion and contraction.

Fig. 2 shows in section a hollow container or unit with rounded edges 21 and with a welded or soldered joint 23. Fig. 3 shows in section a container or unit with bulbous edges 25 with a welded or soldered joint 27. Fig. 4 shows in section a bellows type of container or unit having edges 29 formed with reentrant curvatures adapted to form folds and creases 31, thereby providing increased flexibility. The hollow containers or units also may be formed from seamless tubing, by flattening and/or drawing to the desired shape and size.

In order to permit the hollow tapes or units to warp more readily when they are applied to the cable during manufacture and to provide greater flexibility during bending of the cable and to minimize initial strains, particularly in those portions of the walls of the containers which are subject to flexure during operation, one or more of the walls of the containers may be slightly corrugated laterally of the length, for example, as shown at numeral 33 in Figs. 5 and 6.

Fig. 5 shows a form in which the lateral corrugations are formed only on the flat faces of the container, whereas in Fig. 6 is shown a form in which the corrugations on the faces are carried around the edges of the container, as illustrated at numeral 35, so that said corrugations are substantially continuous around the container.

In Fig. 7 is shown a cable with a series of the hollow tapes or units 4 laid axially of the cable. As shown, a retaining tape 5 may again be used for holding the members 4 against the cable before the sheath is applied.

The units 4 in this embodiment, as well as those shown in Figs. 1, 2, 3, 4, 5 and 6, comprise a series of relatively short, expansible passageways or conduits preferably, though not necessarily, lengthwise of the cable, which contain fluids of gaseous form, which fluids may, if desired, be of nature which would ordinarily adversely affect the insulation of the cable if in contact therewith or interspersed therein. It is apparent that through the usage of a gas such as air, for example, for filling the hollow tapes or units, the internal hydrostatic pressure in the cable is made susceptible of control. Further, it is apparent that this control of hydrostatic pressure is quickly responsive to changed conditions and is largely independent of the degree of viscosity or fluidity of the cable impregnating compound. The hollow units may be used in a cable which has compound-filled passages in or adjacent to the insulation or conductor.

The adjacent ends of the containers may be close together or may be separated appreciable distances, depending for example upon the mobility of the impregnating compound, the extent of equalization of pressure desired along the cable and the volumetric capacity of the containers.

Variations of hydrostatic pressure within a cable are largely determined by the relative temperatures and coefficients of expansion of the conductor, insulation, compound and outer sheath. As the conductor, solid insulation and impregnating compound or oil are substantially incompressible, the resultant pressure from their expansion ordinarily is exerted on the outer sheath. In case this is of lead, permanent stretching of the sheath may be caused. Conversely, when the cable cools the internal hydrostatic pressure will be lower than under corresponding conditions before the sheath had stretched. Low pressures may result in the rapid deterioration and ultimate failure of the insulation, due to the formation of voids and ionization therein under electric stress. The utilization of my hollow gas-filled tapes affords a means and method of controlling or regulating the hydrostatic pressure within predetermined limits and thereby contributes to minimize the stretching of the outer sheath, the formation of voids and the destruction of the insulation.

As the temperature of the different parts of the cable changes and when there is a difference in the rate of expansion of those parts, the pressure upon the walls of the hollow tapes changes and if there is an excess external pressure, such as for example when the cable is heating, the hollow tapes 4 decrease in cross section and thus limit the pressure exerted upon the outer sheath.

Conversely, in case there is a decrease of pressure external to the hollow tapes, such as, for example, when the cable is cooling, the hollow tapes increase in cross section and compensate for the shrinkage of the compound and other parts and thus prevent the pressure from decreasing to values which would cause the formation of voids.

It will be seen from the above that inasmuch as the gaseous fluid is inherently compressible, that expansion and contraction may take place as determined by the conditions existing along or adjacent each of the independent hollow tape sections or containers.

Each hollow tape section or container of the desired cross-sectional area, after being filled with the desired gas at the desired pressure, is closed so that the space occupied by the hollow tape is determined by the pressure and temperature of the cable parts adjacent thereto.

The gas filled hollow tapes in each section of cable constitute a number of relatively small, separate closed containers and thus closely localize the extent of damage or loss of fluid in the event of a leak or rupture of the walls of one of the hollow tapes.

It is apparent that two or more series of hollow tapes may be used in case a greater range of volumetric capacity is desired.

Figure 16:
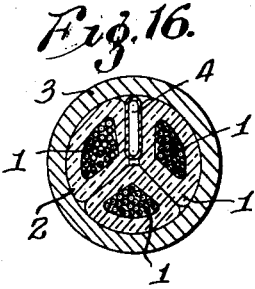

The hollow tape units may be laid between the insulated conductors of a multiple-conductor cable, particularly of the shielded type. This is illustrated in Fig. 16 in which 4 is a hollow tape or flat tube unit of the shape of Fig. 2.

Figure 9:
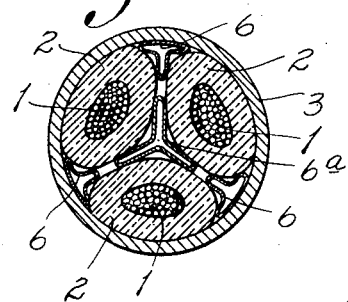
Fig. 9 is a cross section of a cable showing the application of the parts shown in Fig. 8.

The separate hollow containers can also be made in a generally triangular shape instead of in flat tape form. Fig. 8 illustrates shapes 6 and 6a adapted in shape to lie respectively in the spaces ordinarily occupied by lateral and central fillers in a 3-conductor, sector type cable such as shown in Fig. 9. Either of these shapes may have a portion lie between the point of nearest approach of the insulated conductors, or either or both shapes of tube may be confined to the filler space. In Fig. 9 the shapes 6 and 6a are shown in position in a cable and these shapes may be used either singly or together, or shape 6 may be used with the flat tube unit or tubes of Fig. 16.

Figure 12:
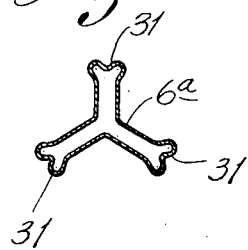
Figs. 12, 13 and 14 are cross sections showing modified forms of the Fig. 8 triangular shapes.
Figure 13:
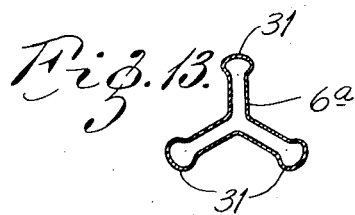

As illustrated in Figs. 12, 13 and 14 the edges 31 of the Fig. 8 members may be formed as are the edges of the tape shown in Figs. 2, 3 and 4, that is, made bulbous or convoluted to various degrees.

Figure 10:
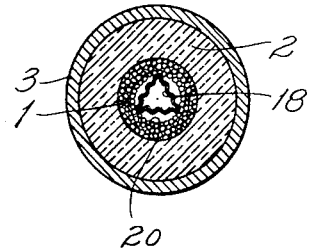
Fig. 10 is a cross section of a cable showing another form of the invention.
Figure 11:
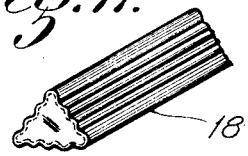
Fig. 11 is a trimetric view showing one of the members used in the Fig. 10 construction.

Fig. 10 illustrates expansible, triangular-shaped convoluted containers 18 carried in the center 20 of the conductor 1, in a cable of the hollow conductor type. Fig. 11 shows a container 18 in enlarged view. The containers are preferably formed with a twist or lay several times their diameter before insertion into the cable in order to afford greater flexibility during bending of the cable. The gas is carried inside of the containers 18. The forms of containers shown in Figs. 2, 3, 4, 8, 12, 13 and 14 are also adaptable for use in a hollow conductor.

The separate gas-filled hollow tapes or containers may be applied separately to or between the insulated conductors, or may be introduced within a hollow conductor. They may be linked together for example as illustrated in Fig. 15 by means of wires 41 looped or hooked through holes 43 at the ends so they form a chain of tapes or containers for application to or along the insulated conductors or, for drawing through the center of a hollow conductor.

It is to be understood that depending upon circumstances, certain classes of gas within the hollow tapes or containers may under certain conditions be more desirable than others, taking for example an inert gas such as nitrogen.

It is also to be understood in this invention that lead cable of the class described is usually laid in lengths or sections which are joined together at suitable splices. These sections are usually many feet in length. It is a characteristic of this invention that the equalizing, hollow tapes or units are much shorter than the cable sections, as distinguished from wound or applied tapes of prior disclosures which are continuous through all or a substantial fraction of the cable section. It is to be understood that one of the distinguishing features herein is the change in length of the tape units, whereby local conditions at one point in the cable may be effected or determined independently of the other local conditions therein.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The cable comprising a conductor, a sheath surrounding said conductor, and a series of closed, hollow containers within the sheath, said hollow containers being linked to form at least one chain.

2. The cable comprising a conductor, insulation surrounding said conductor, and a series of closed containers within said conductor linked to form at least one chain.

3. The cable comprising a conductor, a sheath around the conductor, insulating material located within the sheath and around the conductor and forming a core, and a series of relatively flat, separate, hollow and closed containers relatively long in one direction with at least one flat surface in contact with the insulation laid axially beneath the sheath and on the core, said containers comprising laterally expansible members, each of which forms a single-chamber unit.

4. The cable comprising conductors, a sheath around the conductors, insulating material located within the sheath and around the respective conductors, and a series of relatively flat, separate, hollow and closed containers within the sheath and having their flat portions between the respective insulated conductors and extending lengthwise of the cable, said containers comprising laterally expansible members, each of which forms a single-chamber unit.

5. The cable comprising a conductor, a sheath around the conductor, insulating material located within the sheath and around the conductor, and a series of relatively flat, separate, hollow and closed containers comprising laterally expansible members relatively long in one direction with at least one flat surface in contact with the insulation, each of which forms a single-chamber unit, said units being helically arranged and laterally corrugated.

6. The cable comprising a conductor, a sheath around the conductor, insulating material located within the sheath and around the conductor, and a series of separate, hollow and closed containers comprising laterally expansible flat members, the long dimensions of which are lengthwise of the cable, each of which forms a single-chamber unit, said units being laid lengthwise of the cable.

7. The cable comprising a conductor, a sheath around the conductor, insulating material located within the sheath and around the conductor, and a series of separate, hollow and closed containers comprising laterally expansible flat members, the long dimensions of which are lengthwise of the cable, each of which forms a single-chamber unit, said units being laid lengthwise of the cable, and being laterally corrugated.

8. The cable comprising a conductor, a sheath around the conductor, insulating material located within the sheath and around the conductor, and a series of substantially flat, separate, hollow and closed containers beneath the sheath and above the insulation, said containers comprising laterally expansible members, each of which forms a single-chamber unit, said units being laid end to end lengthwise of the cable, said units having the planes of their substantially flat faces arranged along the length of the cable.

9. The cable comprising a conductor, a sheath around the conductor, a series of substantially flat, hollow containers having an inert gas therein and located within the sheath, said conductors being outside of said container and said containers comprising laterally expansible members having their substantially flat faces lengthwise of the cable.

10. The cable comprising a sheath, a plurality of conductors therein, insulating material around the conductors and forming a cable core, and trifurcated, laterally expansible chambers laid serially between the conductors.

11. The cable comprising a conductor, a sheath around the conductor, and a series of relatively flat walled, hollow, closed, laterally expansible units within said sheath, said units being corrugated transversely of the walls and having their flatwise dimensions arranged substantially parallel to the cable axis.

12. The cable comprising a conductor, a sheath around the conductor, and a series of separate, closed laterally expansible and flat inert gas-containing units within the sheath and having their flatwise dimensions arranged substantially parallel to the cable axis.

PHILIP H. CHASE.